US012640520B2

(12) United States Patent
Wu

(10) Patent No.: US 12,640,520 B2
(45) Date of Patent: May 26, 2026

(54) TERMINAL BLOCK DEVICE AND LOCKING-TYPE ELECTRICAL CONNECTION PLUG THEREOF

(71) Applicants: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CN)

(72) Inventor: Shang-Tsai Wu, New Taipei City (TW)

(73) Assignees: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CN)

( * ) Notice: Subject to any disclaimer, the term of this patent is extended or adjusted under 35 U.S.C. 154(b) by 368 days.

(21) Appl. No.: 18/435,383

(22) Filed: Feb. 7, 2024

(65) Prior Publication Data

US 2025/0253582 A1 Aug. 7, 2025

(51) Int. Cl.

*H01R 13/639* (2006.01)
*H01R 9/24* (2006.01)
*H01R 13/24* (2006.01)
*H01R 13/502* (2006.01)
*H01R 13/629* (2006.01)

(52) U.S. Cl.

CPC ......... *H01R 13/639* (2013.01); *H01R 9/2416* (2013.01); *H01R 13/24* (2013.01); *H01R 13/502* (2013.01); *H01R 13/629* (2013.01)

(58) Field of Classification Search

CPC .... H01R 13/639; H01R 13/24; H01R 13/502; H01R 13/629; H01R 9/2416

See application file for complete search history.

(56) References Cited

U.S. PATENT DOCUMENTS 9,397,444 B1 * 7/2016 Wu ...................... H01R 4/4828
9,466,894 B2 * 10/2016 Wu ...................... H01R 13/42
10,014,594 B1 * 7/2018 Wu ...................... H01R 4/4828
(Continued)

*Primary Examiner* — Thanh Tam T Le
(74) *Attorney, Agent, or Firm* — HDLS IPR SERVICES; Chun-Ming Shih

(57) ABSTRACT

A terminal block device and its locking-type electrical connection plug are provided. The terminal block device includes the locking-type electrical connection plug and an electrical connection socket connected with each other. The locking-type electrical connection plug includes a housing and a locking handle. The housing includes a guide groove divided into two segments. The locking handle includes a pressing part, a latch body, and an operating section. The latch body snaps onto the electrical connection socket. The operating section includes two shafts and an elastic component. The two shafts are guided by the two segments. The elastic component exerts an elastic force on the housing. When the pressing part is pressed, the locking handle is guided by the two shafts to swing, causing the latch body to lift and disengage from the electrical connection socket, and making the elastic component store elastic energy.

20 Claims, 9 Drawing Sheets

100

3

(56) References Cited

U.S. PATENT DOCUMENTS

| | | | | |
|---|---|---|---|---|
| 10,153,564 | B1 * | 12/2018 | Wu | H01R 12/00 |
| 10,381,754 | B1 * | 8/2019 | Wu | H01R 13/6275 |
| 10,490,916 | B1 * | 11/2019 | Wu | H01R 4/4821 |
| 11,217,913 | B1 * | 1/2022 | Wu | H01R 4/4828 |
| 11,757,214 | B2 * | 9/2023 | Wu | H01R 4/4835<br>439/713 |

* cited by examiner

TERMINAL BLOCK DEVICE AND LOCKING-TYPE ELECTRICAL CONNECTION PLUG THEREOF

BACKGROUND OF THE INVENTION

Technical Field

The present disclosure relates to a terminal block, particularly to a terminal block device and a locking-type electrical connection plug thereof.

Description of Related Art

Regarding terminal blocks, they include an electrical connection plug and an electrical connection socket. The electrical connection plug is equipped with numerous wire insertion holes and multiple clamping terminals corresponding to each wire insertion hole. The electrical connection socket is provided with several conductive terminals and is electrically welded to a circuit board. By plugging the electrical connection plug detachably into the electrical connection socket, the circuit board, the clamping terminals of the electrical connection plug, and the conductive terminals of the electrical connection socket are electrically interconnected.

However, conventional terminal blocks, after its electrical connection plug and socket are interconnected, rely only on the tight fit therebetween and the clamping force of the clamping terminals on the conductive terminals to maintain the connection. Once an external force greater than the tight fit and clamping force is applied, the electrical connection plug will still detach from the socket, a problem that has long been criticized.

Therefore, how to improve the deficiencies of the aforementioned prior technology is a major issue that the inventor of this disclosure is urgently eager to solve.

SUMMARY OF THE INVENTION

It is an objective of the present disclosure to provide a terminal block device and a locking-type electrical connection plug thereof, primarily designed to lock onto the electrical connection socket using the locking handle, and to unlock by pressing the pressing part of the locking handle.

Accordingly, the present disclosure provides a locking-type electrical connection plug, including: a housing, provided with a guide groove, wherein the guide groove is divided into a first segment and a second segment, one end of the first segment is away from one end of the second segment, while another end of the first segment is close to another end of the second segment; and a locking handle including a pressing part, a latch body, and an operating section located between the pressing part and the latch body, wherein the operating section is disposed inside the housing and includes a first shaft and a second shaft, the first shaft is guided by the first segment, the second shaft is guided by the second segment, and the locking handle further includes an elastic component that exerts an elastic force on the housing, wherein upon pressing the pressing part, the first shaft and the second shaft slide within the first segment and the second segment, respectively, the locking handle swings in a direction relative to the housing, the latch body moves with the locking handle along the direction to be elevated relative to the housing, and the elastic component stores elastic energy through the locking handle swinging along the unlocking direction.

The present disclosure further provides a terminal block device, including: an electrical connection socket including a locking part; and the locking-type electrical connection plug mentioned above. The locking-type electrical connection plug and the electrical connection socket may be detachably connected to each other, and the latch body of the locking handle is correspondingly engaged with the locking part. Upon pressing the pressing part, the first shaft and the second shaft slide within the first segment and the second segment, respectively, the locking handle swings in a direction relative to the housing, the latch body moves with the locking handle along the direction to be elevated relative to the housing to be disengaged from the locking part, and the elastic component stores elastic energy through the locking handle swinging along the unlocking direction.

Compared to related-art technology, the present disclosure has the following benefits: it achieves a better additional fixing effect, ensuring that the locking-type electrical connection plug has an improved resistance to being pulled out.

BRIEF DESCRIPTION OF THE DRA WINGS

DETAILED DESCRIPTION

Detailed explanations and technical content related to this disclosure are illustrated in conjunction with the drawings below. However, the accompanying drawings are provided only for reference and explanation and are not intended to limit the scope of this disclosure.

Figure 7:
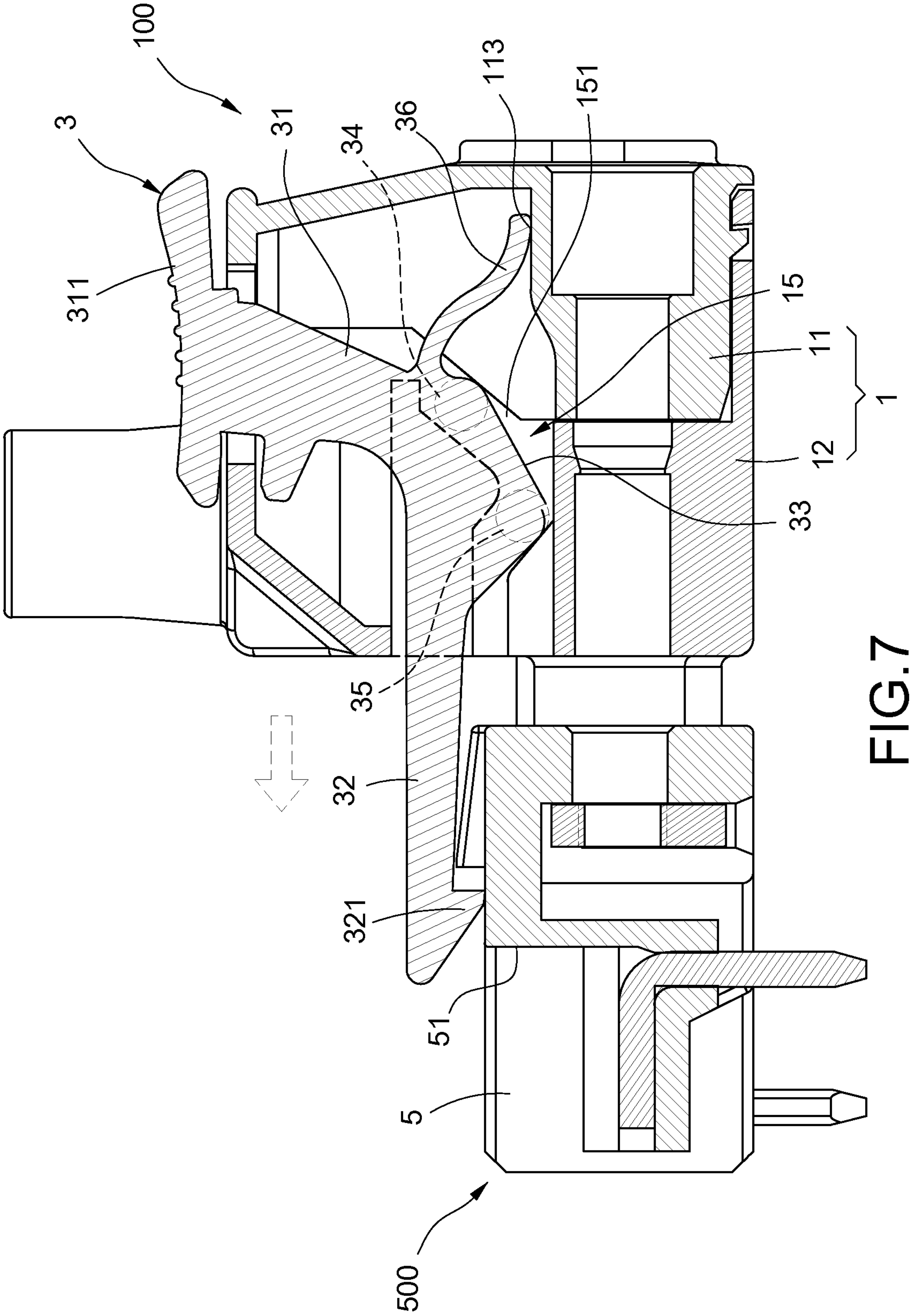
FIG. 7 is a schematic cross-sectional view of the locking-type electrical connection plug and an electrical connection socket of the present disclosure when the locking-type electrical connection plug is plugged into the electrical connection socket.

This disclosure provides a terminal block device and a locking-type electrical connection plug thereof, as shown in FIG. 7. The terminal block device includes a locking-type electrical connection plug 100 and an electrical connection socket 500. The locking-type electrical connection plug 100 may be detachably connected to the electrical connection socket 500, and they are electrically conductive when connected. The electrical connection socket 500 is mounted on a circuit board (not illustrated in figures) and is electrically connected to the circuit board. Furthermore, the electrical connection socket 500 includes a socket body 5 which is provided with or includes a locking part 51.

As shown in FIGS. 1 to 6, the locking-type electrical connection plug 100 includes a housing 1 and a locking handle 3. The locking handle 3 allows the locking-type electrical connection plug 100 and the electrical connection socket 500 to be lockingly engaged with each other in a detachable manner.

Figure 1:
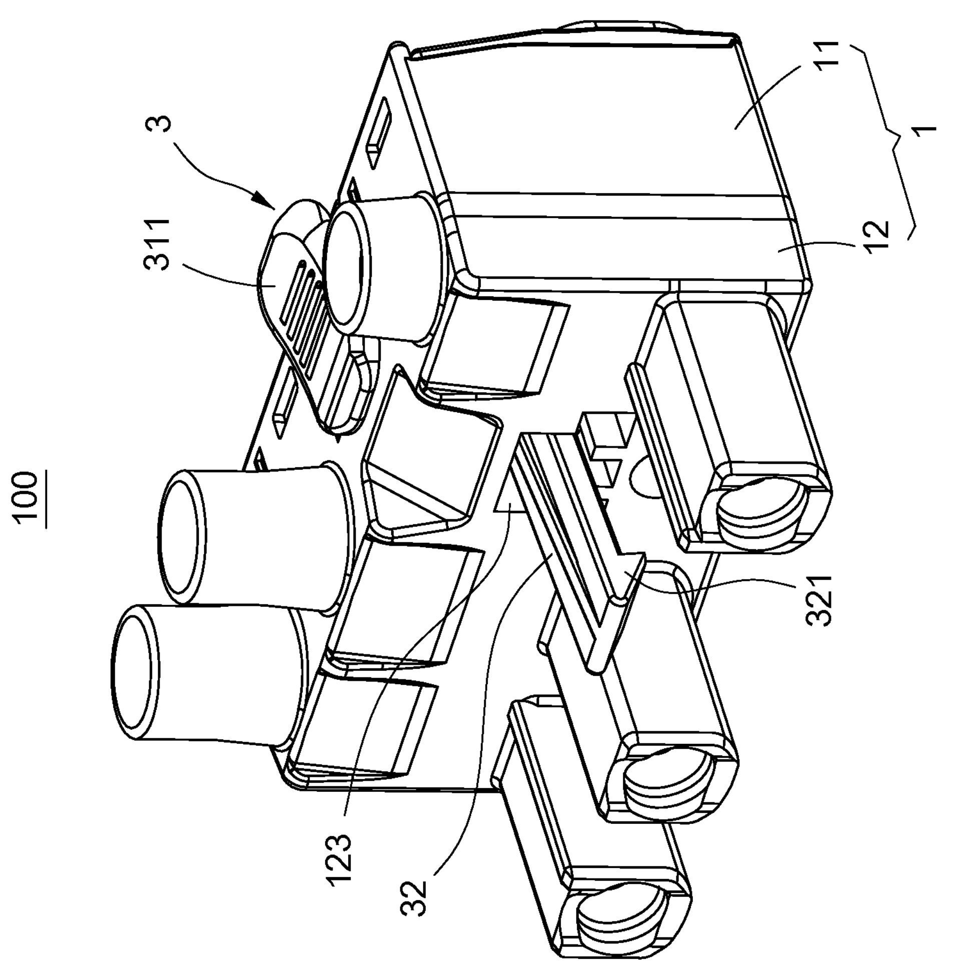
FIG. 1 is a perspective view of a locking-type electrical connection plug of the present disclosure.
Figure 5:
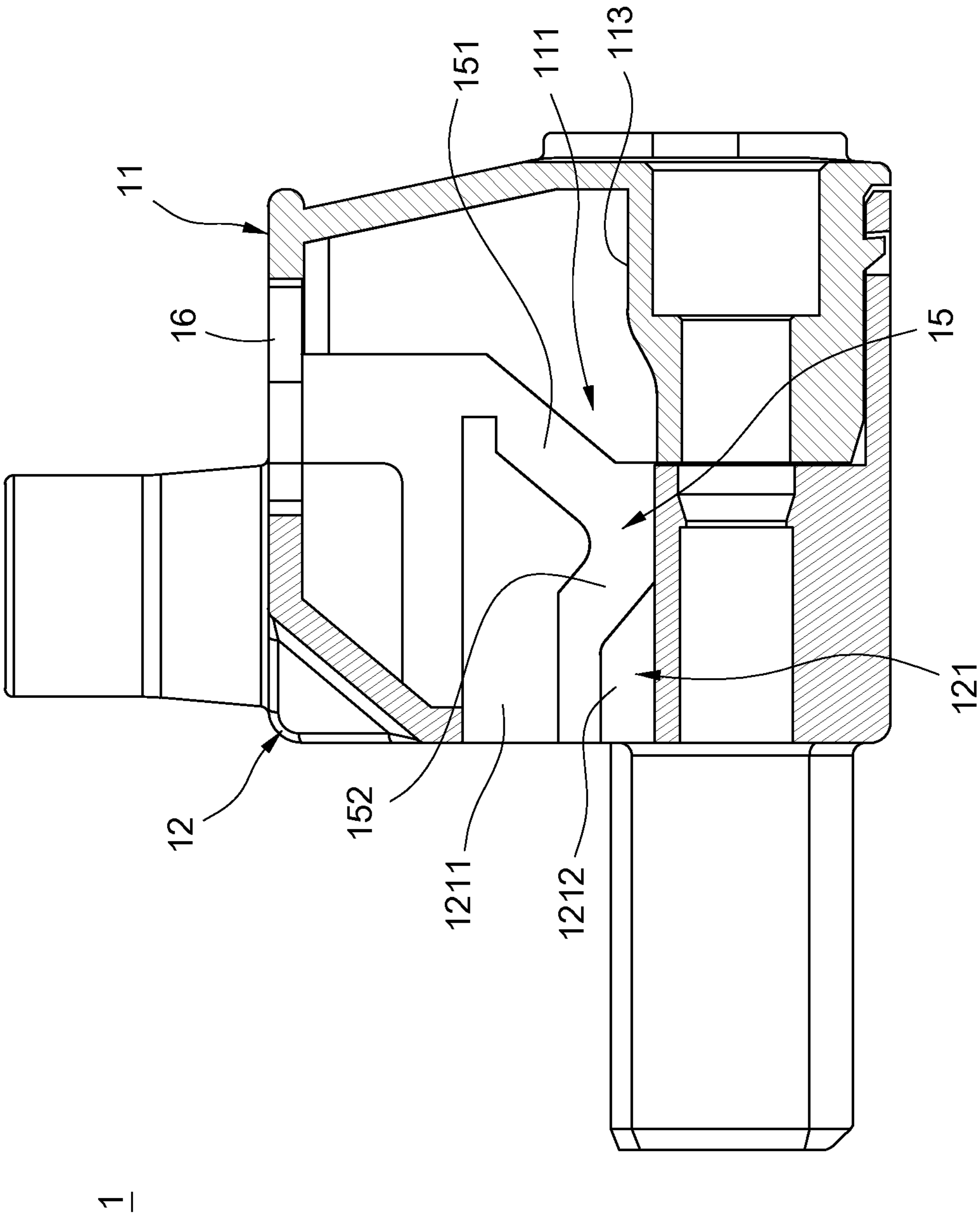
FIG. 5 is a schematic cross-sectional view of a housing in FIG. 2 after assembly according to the present disclosure.

The housing 1 may be a single-piece structure (not illustrated in figures) and is provided with a guide groove 15, as shown in FIG. 5. The guide groove 15 generally has a V-shape and is divided into a first segment 151 and a second segment 152. One end of the first segment 151 and one end of the second segment 152 are away from each other, and the other ends of the first segment 151 and the second segment are close to each other. Specifically, the above-mentioned other ends of the first segment 151 and the second segment 152 are connected to each other to form the aforementioned V-shape. Additionally, the housing 1 is also provided with a stopper 113 and includes a side opening 123 as shown in FIG. 1 and a top opening 16 as shown in FIG. 5.

Figure 2:
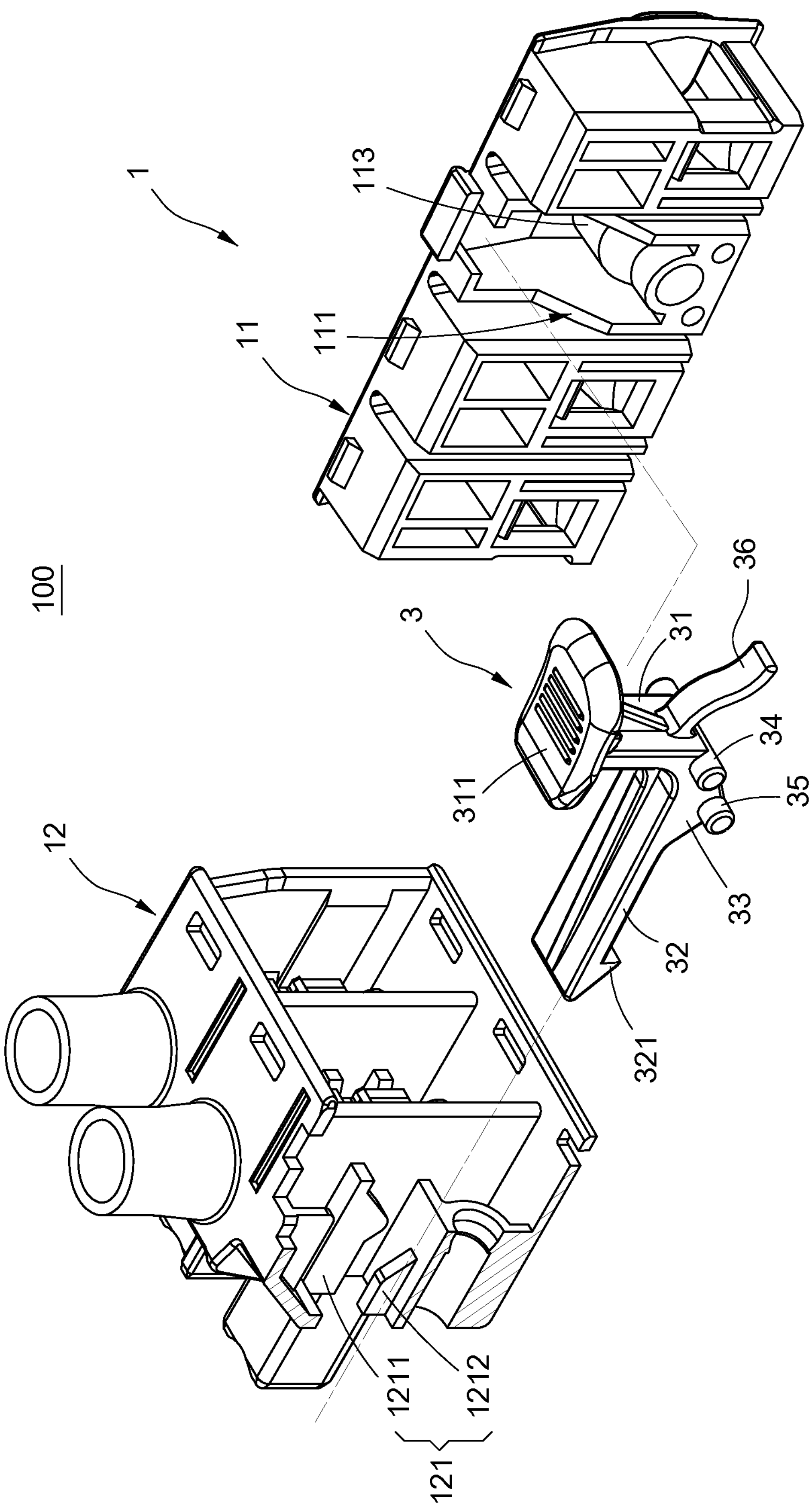
FIG. 2 is a perspective exploded view of the locking-type electrical connection plug of the present disclosure.

The housing 1 may also be a two-piece structure (or a structure with more than two pieces) as shown in the drawings. The two-piece housing 1 has a first shell 11 and a second shell 12. The first shell 11 and the second shell 12 jointly form the aforementioned guide groove 15 and the top opening 16 when being combined. Specifically, as shown in FIGS. 2 and 5, the first shell 11 contains a first groove structure 111, and the second shell 12 contains a second groove structure 121. The first groove structure 111 and the second groove structure 121 together assemble the guide groove 15. The second groove structure 121 includes an upper component 1211 and a lower component 1212 that are spaced apart, the first groove structure 111 includes another lower component (not labeled in figures), and these three components collectively form the guide groove 15. It should be noted that the aforementioned stopper 113 is situated (or formed) inside the first shell 11, and the aforementioned side opening 123 is located on one side of the second shell 12.

The locking handle 3 is inserted in the housing 1 and includes a pressing part 311, a latch body 321, and an operating section 33. The operating section 33 is located between the pressing part 311 and the latch body 321. The operating section 33 is disposed within the housing 1 and includes a first shaft 34 and a second shaft 35 arranged side by side at intervals. The first shaft 34 is guided by the first segment 151, and the second shaft 35 is guided by the second segment 152. Additionally, the locking handle 3 is provided with an elastic component 36, which exerts an elastic force on the stopper 113 inside the housing 1. It should be noted that the first shaft 34 and the second shaft 35 are arranged obliquely, that is, as shown in FIG. 6 in conjunction with FIG. 5, the first shaft 34 is adjacent to the aforementioned one end of the first segment 151, and the second shaft 35 is adjacent to the aforementioned other end of the second segment 152.

Figure 3:
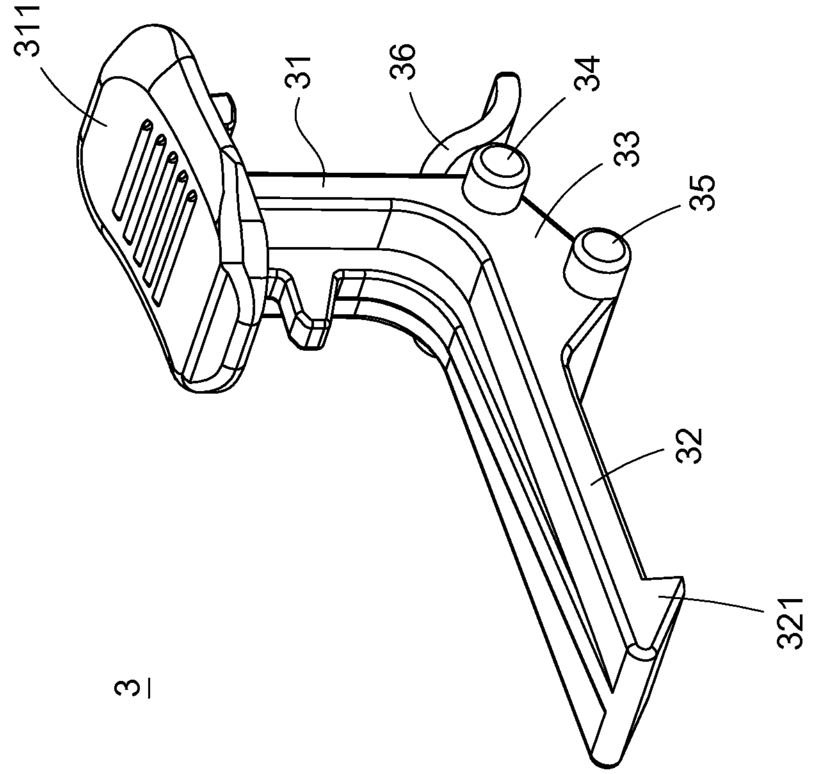
FIG. 3 is a top perspective view of a lock handle in FIG. 2 according to the present disclosure.
Figure 4:
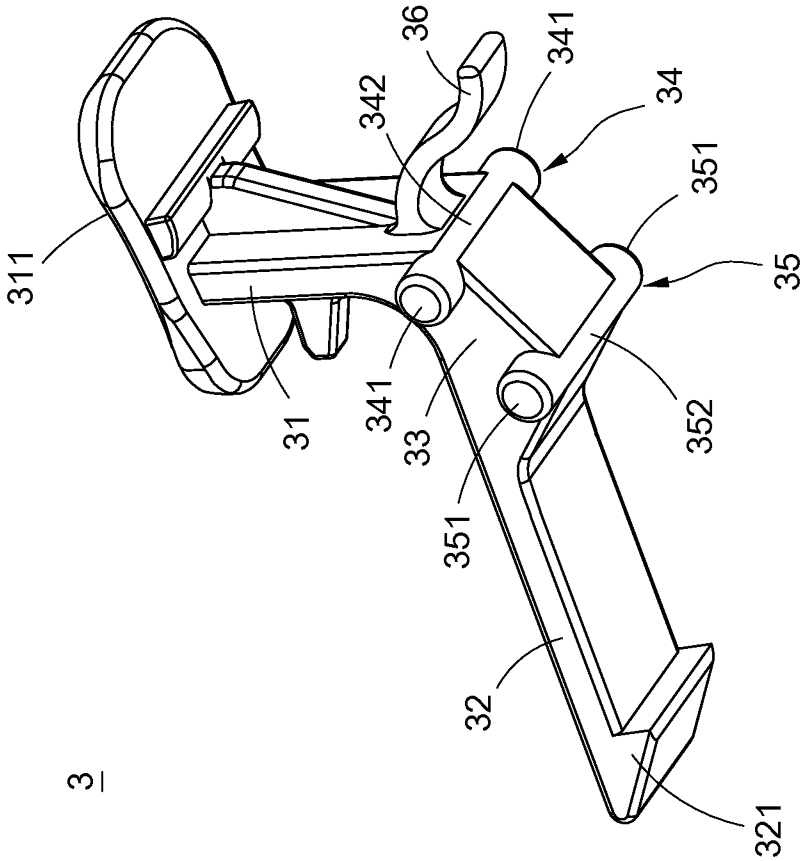
FIG. 4 is a bottom perspective view of the lock handle in FIG. 2 according to the present disclosure.
Figure 6:
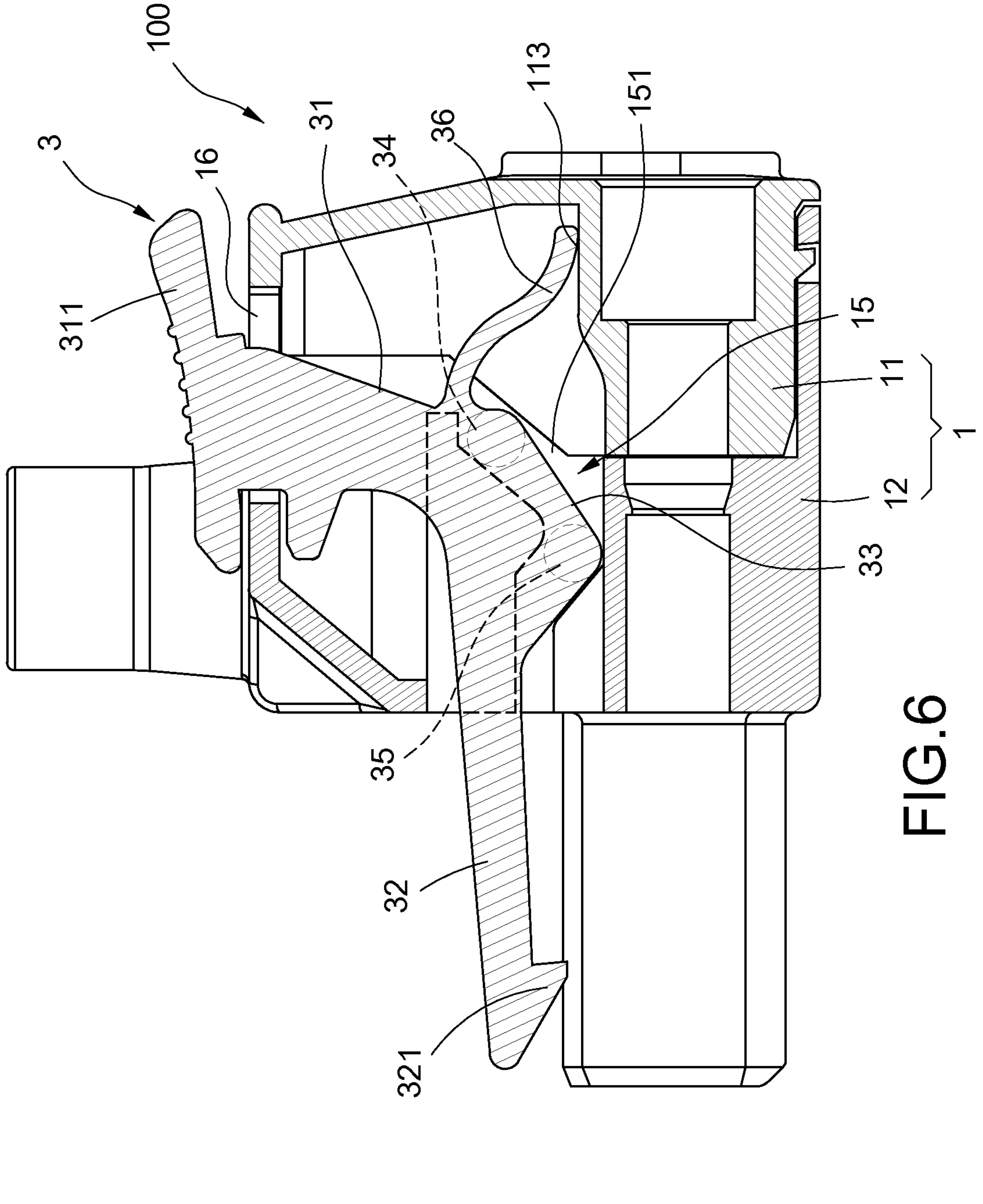
FIG. 6 is a schematic cross-sectional view of the locking-type electrical connection plug of the present disclosure after assembly.

Specifically, as shown in FIGS. 3, 4, and 6, the operating section 33 is an inverted triangular body, which has three vertices. The operating section 33 extends with a linkage arm 31 and a latch arm 32, and the linkage arm 31 and latch arm 32 generally form an L-shape. The linkage arm 31 extends from the aforementioned top opening 16 and has the pressing part 311 exposed from the top opening 16, and the latch arm 32 extends from the aforementioned side opening 123 and includes the latch body 321 exposed from the side opening 123. The first shaft 34, the second shaft 35, and the latch arm 32 are respectively arranged corresponding to the three vertices, with the linkage arm 31 and the elastic component 36 similarly positioned at the same vertex as the first shaft 34. It should be mentioned that the latch arm 32 and the elastic component 36 extend in opposite directions from the operating section 33, hence the latch arm 32 and the elastic component 36 extend away from each other, and the operating section 33 is correspondingly located between the latch arm 32 and the elastic component 36.

The elastic component 36 may be any component that exerts an elastic force, such as a spring (not illustrated in figures) or an elastic arm as shown in the drawings. In this embodiment, using an elastic arm as an example. The elastic component 36 is disposed on one end of the operating section 33, and as previously mentioned, is connected to one of the three vertices. The other end of the elastic component 36 elastically abuts against the stopper 113. Due to the inclined positioning of the elastic component 36 against the stopper 113, the elastic component 36 is predisposed to an elastic bias when force is applied.

The first shaft 34 includes two end portions 341 and a shaft body 342 connected between the two end portions 341. The end portions 341 protrude from two sides of the operating section 33, and the shaft body 342 is only partially exposed from one vertex (the first vertex) of the operating section 33. Similarly, the second shaft 35 includes two end portions 351 and a shaft body 352 connected between the two end portions 351. The end portions 351 also protrude from two sides of the operating section 33, and the shaft body 352 is only partially exposed from another vertex (the second vertex) of the operating section 33. Accordingly, the first shaft 34 may slide within the first segment 151 of the guide groove 15 by its end portions 341, or its shaft body 342, or both its end portions 341 and shaft body 342. Here, the shaft body 342 contacts the first segment 151 at its partially exposed part. Similarly, the second shaft 35 may slide within the second segment 152 of the guide groove 15 by its end portions 351, or its shaft body 352, or both its end portions 351 and shaft body 352, and the shaft body 352 also contacts the second segment 152 at its partially exposed part.

Consequently, as shown in FIGS. 5 and 6, when a user presses the pressing part 311, the linkage arm 31 may be linked with the operating section 33. At this time, due to the guidance of the first shaft 34 by the first segment 151, the linkage arm 31 moves in a certain direction (clockwise) and sinks into the housing 1 (refer to FIG. 9). Additionally, as the second shaft 35 is guided by the second segment 152, the latch arm 32 swings upward in an arc in the same direction (clockwise) (refer to FIG. 9), causing the latch body 321 to follow the movement and rise with the latch arm 32. In this manner, the entire locking handle 3 may swing relative to the housing 1 in the same direction (clockwise), like a cradle. Simultaneously, after the movement of the locking handle 3, the elastic component 36 is biased under the restraint of the stopper 113, thereby storing elastic energy. In other words, the locking-type electrical connection plug 100, by means of the locking handle 3 and the guide groove 15, may achieve a better additional fixing effect (less likely to detach) and therefore, also possesses a better resistance to unplugging.

When the user releases the pressure on the pressing part 311, the entire locking handle 3 is pulled back in an opposite direction (counterclockwise) to its original position by the elastic restoring force of the elastic component 36 (as shown in FIG. 6).

Figure 8:
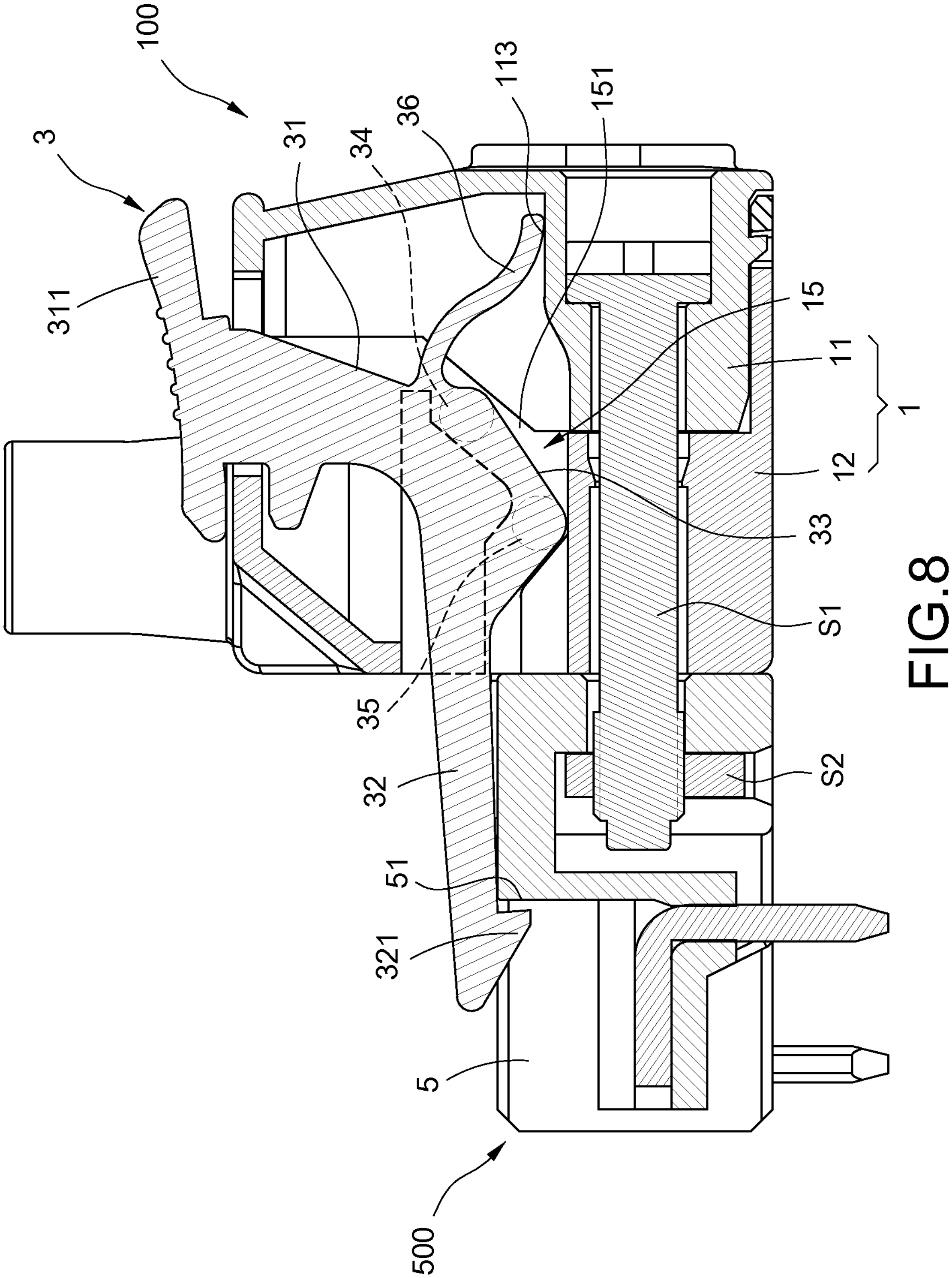
FIG. 8 is a schematic cross-sectional view of the present disclosure, showing the locking-type electrical connection plug and the electrical connection socket after being plugged into each other, according to FIG. 7.
Figure 9:
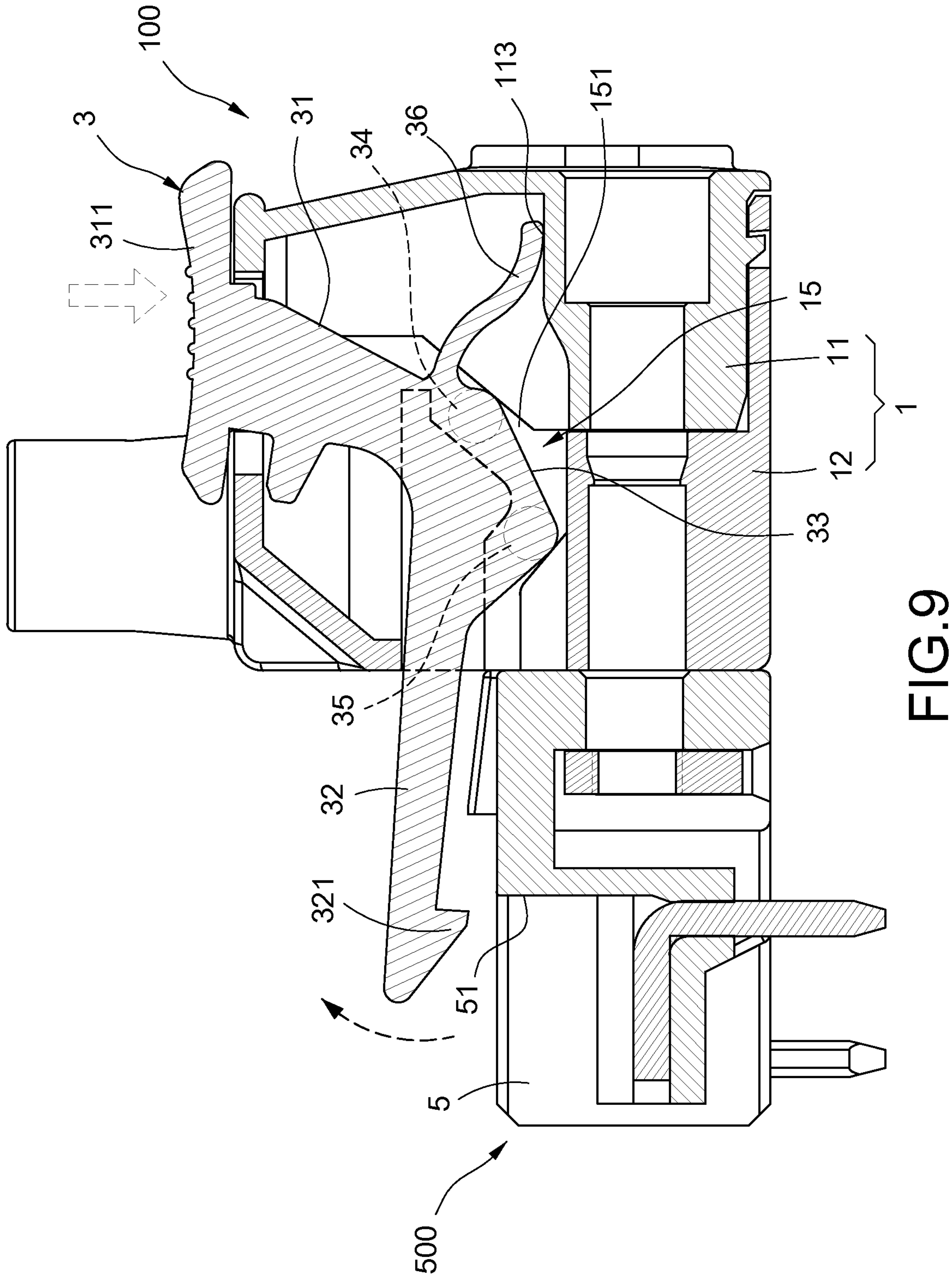
FIG. 9 is a schematic cross-sectional view of the present disclosure, depicting a state after pressing the lock handle, according to FIG. 8.

As shown in FIGS. 7 to 9, in conjunction with FIG. 5, during the plugging process of the aforementioned terminal block device, when the locking-type electrical connection plug 100 is plugged into the electrical connection socket 500, the latch body 321 of the locking handle 3 is correspondingly engaged inside the locking part 51 of the electrical connection socket 500 (as shown in FIG. 8), providing the terminal block device with an enhanced additional fixation and improving its resistance to being unplugged.

Consequently, when it is desired to remove the locking-type electrical connection plug 100 from the electrical connection socket 500, as shown in FIG. 9, the pressing part 311 of the locking handle 3 is first pressed. Then, as previously described, the entire locking handle 3 swings in the same direction (clockwise) relative to the housing 1, like a cradle. This causes the latch body 321 to follow the movement of the latch arm 32 in an upward arc, thereby lifting the latch body 321. This lifting movement allows the raised latch body 321 to be disengaged from the locking part 51 (while also causing the elastic component 36 to be biased and store elastic energy due to the movement of the locking handle 3). This action releases the locking handle 3 from locking onto the electrical connection socket 500, allowing the locking-type electrical connection plug 100 to be removed in the reverse direction from the electrical connection socket 500.

Especially, during the locking process, as the locking handle 3 swings in the aforementioned direction (clockwise) like a cradle, it causes the latch body 321 to be engaged reversely with the locking part 51 after the swinging motion. This particularly ensures a tight fit of the electrical connection socket 500 against the locking-type electrical connection plug 100, thus guaranteeing no looseness between the locking-type electrical connection plug 100 and the electrical connection socket 500. Moreover, when unlocking, since the locking handle 3 also swings in a cradle-like manner but in the opposite direction (counterclockwise), the locking handle 3 drives the latch body 321 to move away from the locking part 51 while simultaneously lifting upwards. This means the unlocking operation not only releases the latch body 321 from the reverse engagement with the locking part 51 but also elevates the latch body 321 away from the locking part 51, thereby ensuring that the locking-type electrical connection plug 100 may be smoothly removed from the electrical connection socket 500.

Additionally, as shown in FIG. 7, a second screw component (for example, a nut) S2 may be pre-installed inside the electrical connection socket 500. After the locking-type electrical connection plug 100 and the electrical connection socket 500 are connected, a first screw component (for example, a screw) S1 may be inserted through the locking-type electrical connection plug 100 and into the electrical connection socket 500, and then screwed into the second screw component S2. This allows for further securing of the locking-type electrical connection plug 100 and the electrical connection socket 500 together through screw fastening.

In summary, the terminal block device and the locking-type electrical connection plug thereof presented in the present disclosure may indeed achieve the intended purpose and effect, and are capable of resolving the shortcomings of conventional technology.

The aforementioned descriptions are merely some feasible embodiments of this disclosure and are not intended to limit the protection scope of the patent for this disclosure. All equivalent structural changes made based on the content of the specification and drawings of this disclosure are to be considered as encompassed within the scope of this application's patent rights, and are hereby clarified.

What is claimed is:

1. An electrical connection plug, comprising:

a housing, comprising a guide groove divided into a first segment and a second segment, wherein one end of the first segment is away from one end of the second segment, and another end of the first segment is close to another end of the second segment; and a locking handle, comprising a pressing part, a latch body, and an operating section located between the pressing part and the latch body, wherein the operating section is disposed in the housing and comprises a first shaft and a second shaft, the first shaft is guided by the first segment, the second shaft is guided by the second segment, and the locking handle further comprises an elastic component exerting an elastic force on the housing;

wherein upon pressing the pressing part, the first shaft and the second shaft slide in the first segment and the second segment, respectively, the locking handle swings in a direction relative to the housing, the latch body moves with the locking handle along the direction to be elevated relative to the housing, and the elastic component stores an elastic energy through the locking handle swinging along the direction.

2. The electrical connection plug according to claim 1, wherein the elastic component is disposed on the operating section.

3. The electrical connection plug according to claim 2, wherein the elastic component is an elastic arm, one end of the elastic component is connected to the operating section, and another end of the elastic component elastically abuts against the housing.

4. The electrical connection plug according to claim 1, wherein the second shaft comprises a shaft body, and a portion of the shaft body is exposed from the operating section and in contact with the second segment.

5. The electrical connection plug according to claim 4, wherein the operating section is an inverted triangular body and comprises three vertices, the operating section comprises a latch arm extended therefrom, the latch arm comprises the latch body, and the latch arm, the first shaft, and the second shaft are arranged on the three vertices correspondingly.

6. The electrical connection plug according to claim 5, wherein the elastic component is an elastic arm, one end of the elastic component is connected to the operating section corresponding to one of the three vertices, and another end of the elastic component elastically abuts against the housing.

7. The electrical connection plug according to claim 1, wherein the first shaft and the second shaft respectively comprise two end portions and a shaft body connected to the two end portions, the first shaft and the second shaft respectively slide in the guide groove by the two end portions, or by the shaft body, or by both the two end portions and the shaft body.

8. The electrical connection plug according to claim 1, wherein the housing comprises a first shell and a second shell, and the first shell and the second shell are combined with each other to collectively define the guide groove.

9. The electrical connection plug according to claim 8, wherein the first shell comprises a first groove structure disposed in the first shell, the second shell comprises a second groove structure disposed in the second shell, and the first groove structure and the second groove structure are combined to collectively define the guide groove.

10. The electrical connection plug according to claim 1, wherein the first shaft is disposed adjacent to the one end of the first segment, and the second shaft is disposed adjacent to the another end of the second segment.

11. A terminal block device, comprising:

an electrical connection socket, comprising a locking part; and an electrical connection plug, comprising:

a housing, comprising a guide groove divided into a first segment and a second segment, wherein one end of the first segment is away from one end of the second segment, and another end of the first segment is close to another end of the second segment; and a locking handle, comprising a pressing part, a latch body, and an operating section located between the pressing part and the latch body, wherein the operating section is disposed in the housing and comprises a first shaft and a second shaft, the first shaft is guided by the first segment, the second shaft is guided by the second segment, the locking handle further comprises an elastic component exerting an elastic force on the housing, the electrical connection plug and the electrical connection socket is detachably connected to each other, and the latch body of the locking handle is correspondingly engaged with the locking part;

wherein upon pressing the pressing part, the first shaft and the second shaft slide in the first segment and the second segment, respectively, the locking handle swings in a direction relative to the housing, the latch body moves with the locking handle along the direction to be elevated relative to the housing to be disengaged from the locking part, and the elastic component stores an elastic energy through the locking handle swinging along the direction.

12. The terminal block device according to claim 11, wherein the elastic component is disposed on the operating section.

13. The terminal block device according to claim 12, wherein the elastic component is an elastic arm, and one end of the elastic component is connected to the operating section, and another end of the elastic component elastically abuts against the housing.

14. The terminal block device according to claim 11, wherein the second shaft comprises a shaft body, and a portion of the shaft body is exposed from the operating section and in contact with the second segment.

15. The terminal block device according to claim 14, wherein the operating section is an inverted triangular body and comprises three vertices, the operating section comprises a latch arm extended therefrom, the latch arm comprises the latch body, and the latch arm, the first shaft, and the second shaft are arranged on the three vertices correspondingly.

16. The terminal block device according to claim 15, wherein the elastic component is an elastic arm, one end of the elastic component is connected to the operating section corresponding to one of the three vertices, and another end of the elastic component elastically abuts against the housing.

17. The terminal block device according to claim 11, wherein the first shaft and the second shaft respectively comprise two end portions and a shaft body connected to the two end portions, the first shaft and the second shaft respectively slide in the guide groove by the two end portions, or by the shaft body, or by both the two end portions and the shaft body.

18. The terminal block device according to claim 11, wherein the housing comprises a first shell and a second shell, and the first shell and the second shell are combined with each other to collectively define the guide groove.

19. The terminal block device according to claim 18, wherein the first shell comprises a first groove structure disposed in the first shell, the second shell comprises a second groove structure disposed in the second shell, and the first groove structure and the second groove structure are combined to collectively define the guide groove.

20. The terminal block device according to claim 11, wherein the first shaft is disposed adjacent to the one end of the first segment, and the second shaft is disposed adjacent to the another end of the second segment.

* * * * *